United States Patent
Kang et al.

(10) Patent No.: US 11,847,407 B2
(45) Date of Patent: Dec. 19, 2023

(54) APPARATUS FOR REMOVING TEXT NOISE FOR TEXT ANALYSIS AND METHOD THEREOF

(71) Applicant: SAMSUNG SDS CO., LTD., Seoul (KR)

(72) Inventors: Na Un Kang, Seoul (KR); Kyung Jun An, Seoul (KR); Sung Ho Jang, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 0 days.

(21) Appl. No.: 17/828,120

(22) Filed: May 31, 2022

(65) Prior Publication Data

US 2022/0382966 A1    Dec. 1, 2022

(30) Foreign Application Priority Data

May 28, 2021 (KR) .................. 10-2021-0069245

(51) Int. Cl.
*G06F 17/00* (2019.01)
*G06F 40/166* (2020.01)
*G06F 16/38* (2019.01)
*G06F 16/35* (2019.01)
*G06F 40/279* (2020.01)

(52) U.S. Cl.
CPC .......... *G06F 40/166* (2020.01); *G06F 16/35* (2019.01); *G06F 16/38* (2019.01); *G06F 40/279* (2020.01)

(58) Field of Classification Search
CPC ........ G06F 40/166; G06F 16/35; G06F 16/38; G06F 40/279
See application file for complete search history.

(56) References Cited

U.S. PATENT DOCUMENTS

| | | | | |
|---|---|---|---|---|
| 7,167,825 | B1* | 1/2007 | Potter | H04L 9/065 380/42 |
| 7,236,932 | B1* | 6/2007 | Grajski | G10L 15/26 704/235 |
| 10,740,474 | B1* | 8/2020 | Ghetti | H04L 9/321 |
| 2006/0085502 | A1* | 4/2006 | Sundararajan | H04L 51/216 709/204 |

(Continued)

FOREIGN PATENT DOCUMENTS

| | | |
|---|---|---|
| CN | 111950240 A | 11/2020 |
| JP | 4058928 B2 | 3/2008 |

(Continued)

OTHER PUBLICATIONS

Contractor, Danish, Tanveer A. Faruquie, and L. Venkata Subramaniam. "Unsupervised cleansing of noisy text." Coling 2010: Posters. 2010 (Year: 2010).*

(Continued)

*Primary Examiner* — Andrew T McIntosh
(74) *Attorney, Agent, or Firm* — The PL Law Group, PLLC (57) ABSTRACT

A method for removing text noise according to an embodiment of the present disclosure includes inspecting quality of the text, correcting the text based on a result of inspection; selecting a noise candidate based on each type of sentences included in the corrected text, wherein the noise candidate is selected for each sentence included in the text and removing at least some of the sentences included in the noise candidate based on the purpose of the text.

18 Claims, 8 Drawing Sheets

(56) References Cited

U.S. PATENT DOCUMENTS

| | | | |
|---|---|---|---|
| 2011/0093258 A1* | 4/2011 | Xu ........................ | G06F 40/237 |
| | | | 704/9 |
| 2018/0143970 A1* | 5/2018 | Skarbovsky .......... | G06F 16/685 |
| 2019/0370323 A1* | 12/2019 | Davidson ................ | G10L 15/26 |
| 2020/0065334 A1* | 2/2020 | Rodriguez .......... | H04M 3/5183 |
| 2020/0082214 A1* | 3/2020 | Salammagari .......... | G06F 40/30 |
| 2021/0117820 A1* | 4/2021 | Canada .................... | G06N 5/04 |
| 2022/0189333 A1* | 6/2022 | Yim ...................... | G06F 40/237 |

FOREIGN PATENT DOCUMENTS

| | | |
|---|---|---|
| JP | 2020-098322 A | 6/2020 |
| JP | 6819976 B1 | 1/2021 |
| KR | 10-1852116 B1 | 4/2018 |
| KR | 10-2020-0073520 A | 6/2020 |

OTHER PUBLICATIONS

Subramaniam, L. Venkata, et al. "A survey of types of text noise and techniques to handle noisy text." Proceedings of The Third Workshop on Analytics for Noisy Unstructured Text Data. 2009 (Year: 2009).*

* cited by examiner

| | 11 | 13 | 20 |
|---|---|---|---|
| 1 | Hello? | Customer, we will respond to your request as follows. | measure details – insert a target loading condition. development result |
| 2 | Hello? | Customer, we will respond to your request as follows. | measure details – source L_OUT_QTY column data -> target OUT_QTY |
| 3 | Hello? | Customer, we will respond to your request as follows. | measure details – insert a target loading condition. development result |
| 4 | Hello? | Customer, we will respond to your request as follows. | measure details – insert a target loading condition. development result |
| 5 | Hello? | Customer, we will respond to your request as follows. | 1. Demand definition - Big Data (SCS) RMA |
| 6 | Hello? | Customer, we will respond to your request as follows. | measure details – arrangement stop being completed once a day at 07:00 development result |
| 7 | Hello? | Customer, we will respond to your request as follows. | Measure details – results of development of the suspension project -GPM |
| 8 | Hello? | Customer, we will respond to your request as follows. | interface time change completion – MOS_ integrated production information (SAS) |
| 9 | Hello? | Customer, we will respond to your request as follows. | measure details – insert a target loading condition. development result |
| 10 | Hello? | Customer, we will respond to your request as follows. | measure details – development results of unused I/F suspension– under I/F |

FIG. 11

APPARATUS FOR REMOVING TEXT NOISE FOR TEXT ANALYSIS AND METHOD THEREOF

CROSS-REFERENCE TO RELATED APPLICATION AND CLAIM OF PRIORITY

This application claims the benefit under 35 USC § 119 of Korean Patent Application No. 10-2021-0069245 filed on May 28, 2021, in the Korean Intellectual Property Office, the entire disclosure of which is incorporated herein by reference for all purposes.

BACKGROUND

1. Technical Field

The present disclosure relates to an apparatus for removing text noise for a text analysis and a method thereof. More particularly, the present disclosure relates to a method for selecting a noise candidate for each sentence included in a text, and removing at least some of the sentences included in the noise candidate based on the purpose of the text.

2. Description of the Related Art

In recent years, attempts have been made to apply deep learning models that have made great achievements in the image field to the text field. For these attempts, an input is subject to vectorization, during which a word vector is formed. A criterion for constituting the word vector includes the appearance frequency of a certain word in a document and simultaneous appearance frequency of a plurality of words in a document.

In order to learn a deep learning model to which artificial intelligence technology is applied, it is necessary to satisfy both qualitative and quantitative aspects of learning data. In particular, a variety of preprocessing techniques have been attempted to satisfy the qualitative aspect of the learning data.

The conventional pre-processing technique concentrates only on removing word-by-word noise, such as removal of stop-words from a text or removal of special characters from the text. However, since it is necessary to remove sentences repeatedly recorded according to types of text, there is a need for the removal of noise in sentence units from the text.

SUMMARY

Technical aspects to be achieved through one embodiment by the present disclosure provide an apparatus for removing text noise in sentence units from a text and a method thereof.

Technical aspects to be achieved through one embodiment by the present disclosure also provide an apparatus for adjusting a level of removing noise to correspond to the purpose of a text analysis and a method thereof.

Technical aspects to be achieved through one embodiment by the present disclosure also provide an apparatus for providing pre-processing to improve the performance of the text analysis and a method thereof.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

According to an embodiment of the present disclosure, there is provided a method for removing text noise. The method performed by a computing device includes inspecting quality of the text, correcting the text based on a result of inspection; selecting a noise candidate based on each type of sentences included in the corrected text, wherein the noise candidate is selected for each sentence included in the text and removing at least some of the sentences included in the noise candidate based on the purpose of the text.

According to another embodiment of the present disclosure, there is provided an apparatus for removing text noise. The apparatus includes a processor, a network interface and a computer program loaded into the memory and executed by the processor, wherein the computer program comprises instructions that cause the processor to perform operations comprising inspecting quality of the text, correcting the text based on a result of inspection, selecting a noise candidate based each type of sentences included in the corrected text, wherein the noise candidate is selected for each sentence included in the text, and removing at least some of the sentences included in the noise candidate based on the purpose of the text.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Figure 1:
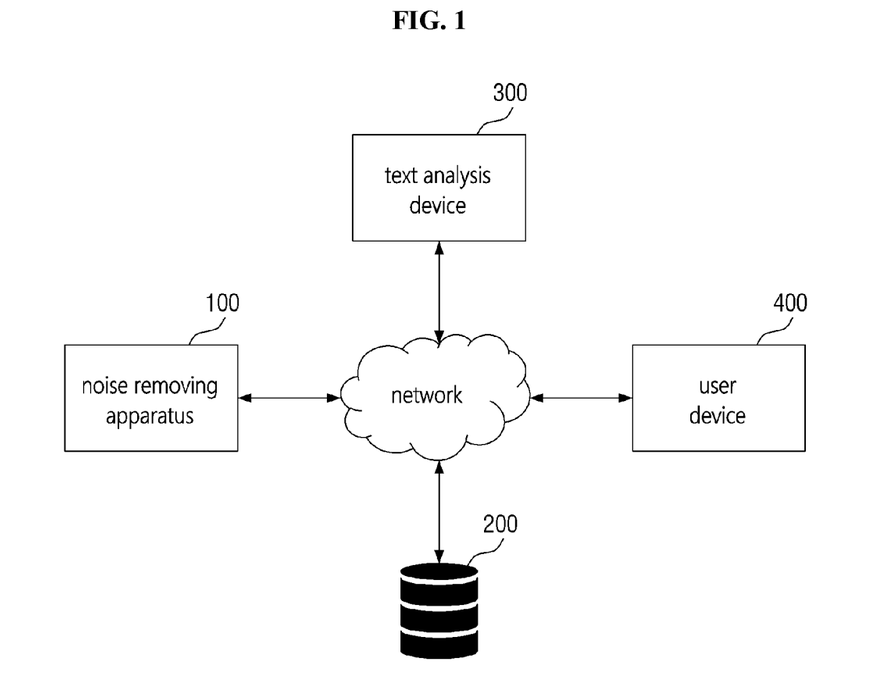
FIG. 1 is a view illustrating an exemplary environment to which an apparatus for removing text noise according to some embodiments of the present disclosure may be applied.

Hereinafter, various embodiments of the present disclosure will be described with reference to the attached drawings:

FIG. 1 is a view illustrating an exemplary environment to which a text noise removing apparatus 100 according to some embodiments of the present disclosure may be applied. FIG. 1 illustrates that one text analysis device 300 is connected to a network, but this is only for providing convenience of understanding, and any number of text analysis devices 300 may be changed Meanwhile, FIG. 1 only illustrates a preferred embodiment for achieving the objective of the present disclosure, and some components may be added or deleted as needed. In addition, it should be noted that the components of the exemplary environment illustrated in FIG. 1 represent functional components functionally distinguished from each other and may be implemented in a form in which a plurality of components are integrated with each other in an actual physical environment. For example, the noise removing apparatus 100 and the text analysis device 300 may be implemented in the same computing device in the form of different logics.

Hereinafter, each of the components illustrated in FIG. 1 will be described in more detail.

The noise removing apparatus 100 may load a text stored in a database 200. In addition, the noise removing apparatus 100 may load a text input from a text collection device (not shown). It should be noted that the text that may be referenced in some embodiments of the present disclosure may refer to all data recorded in the form of characters, and the scope of the present disclosure is not limited by a path through which the noise removing apparatus 100 loads the text.

The noise removing apparatus 100 may pre-process the text to correspond to the purpose of an analysis to be performed by the text analysis apparatus 300. For example, the text may be corrected, and for another example, noise in the text may be removed. Various methods of performing pre-processing by the noise removing apparatus 100 will be described later with reference to FIGS. 2 to 10.

The noise removing apparatus 100 may be implemented with one or more computing devices. For example, all functions of the noise cancellation device 100 may be implemented in a single computing device. As another example, a first function of the noise removing apparatus 100 may be implemented in a first computing device, and a second function may be implemented in a second computing device. Herein, the computing device may be a notebook computer, a desktop, a laptop, or the like, but the present disclosure is not limited thereto, and the computing device may include all kinds of devices having a computing function. However, when a variety of texts are loaded into the noise removing apparatus 100 and they need to be pre-processed to correspond to the purpose of the analysis of the text analysis device 300, it may be preferable to implement the noise removing apparatus 100 with a high-performance server-level computing device. One example of such a computing device will be described later with reference to FIG. 11.

Next, the database 200 may store the text. Herein, the text may be a text collected by the text collection device (not shown). More specifically, the text collection device (not shown) may collect data from a variety of data sources and transmit the data to the database 200, and the database 200 may store the text transmitted by the text collection device (not shown). For example, the text collection device (not shown) may crawl data from a customer center, and the crawled data from the customer center may be mainly a question/answer type text.

In some embodiments, the database 200 may store a text from which noise is removed, generated by the noise removing apparatus 100. Herein, the database 200 may associate and store an original text with the text from which noise is removed.

Next, the text analysis device 300 may analyze the text using the text from which noise is removed, generated by the noise removing apparatus 100. All known techniques for analyzing the text by the text analysis device 300 may be applied to the present disclosure. For example, the text analysis device 300 may generate a search model using the text from which noise is removed, generated by the noise removing apparatus 100. As another example, the text analysis device 300 may generate a classification model for various purposes. For another example, the text analysis apparatus 300 may generate models such as a topic extraction model, a clustering model, an event processing model, and an inference model.

Next, a user device 400 may use a model generated by the text analysis device 300. For example, the user device 400 may use the search model generated by the text analysis device 300. Herein, the user device 400 may have a web browser or a dedicated application installed therein to use the model generated by the text analysis device 300. For example, the user device 400 may be one of a desktop, a workstation, a laptop, a tablet, and a smart phone, but the present disclosure is not limited thereto, and the user device 400 may include all kinds of devices provided with any computing function.

Meanwhile, each of the components illustrated in FIG. 1 may refer to software or hardware such as a field programmable gate array (FPGA) or an application-specific integrated circuit (ASIC). However, the components are not limited to software or hardware, and may be configured to be in a storage medium capable of addressing, or to execute one or more processors. The functions provided by the components may be implemented with more subdivided components, or may be implemented with one component for performing a specific function by combining a plurality of components.

In some embodiments, the components illustrated in FIG. 1 may communicate via a network. The network may be implemented with all kinds of wired/wireless networks such as a local area network (LAN), a wide area network (WAN), a mobile radio communication network, and a wireless broadband Internet (WiBro).

So far, the configuration and operation of the noise removing apparatus 100 according to some embodiments of the present disclosure have been described with reference to FIG. 1. Hereinafter, methods according to various embodiments of the present disclosure will be described in detail with reference to FIGS. 2 to 9.

Each step of the methods may be performed by a computing device. In other words, each step of the methods may be implemented with one or more instructions executed by the processor of the computing device. All steps included in the methods may be performed by one physical computing device. However, first steps of the method may be performed by a first computing device, and second steps of the method may be performed by a second computing device. Hereinafter, a further explanation will be described by assuming that each of the steps of the methods is performed by the noise removing apparatus 100 illustrated in FIG. 1. However, for convenience of explanation, a description of a subject for operating each step included in the methods may be omitted.

Figure 2:
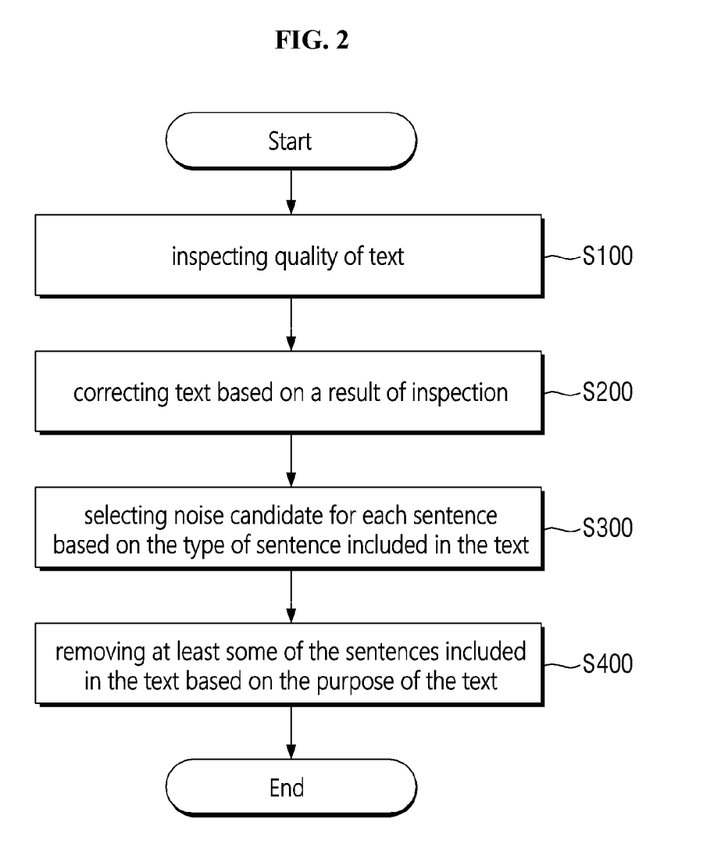
FIG. 2 is an exemplary flowchart illustrating a method for removing text noise according to some embodiments of the present disclosure.

Referring to FIG. 2, in a step S100, the quality of the text may be inspected. According to the present embodiment, the quality of the text may be inspected to determine whether or not the text needs to be corrected. In addition, when the text needs to be corrected, the degree of need for correction (the degree to which the text needs to be corrected) can also be determined.

Figure 3:
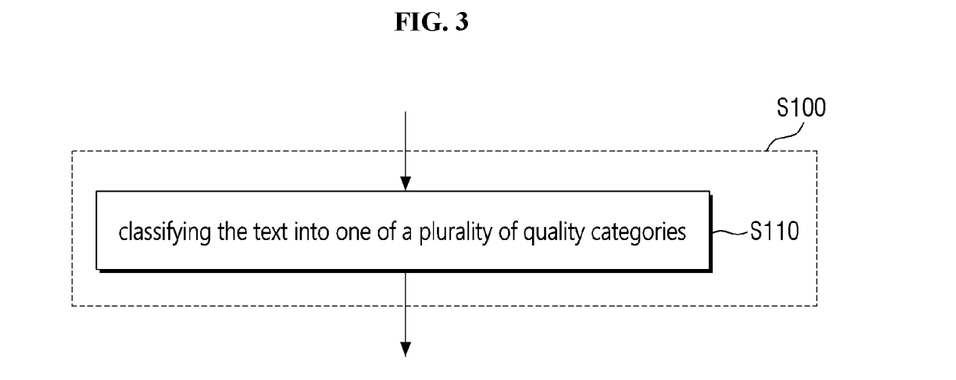
FIG. 3 is an exemplary flowchart illustrating an operation of inspecting the quality of the text described with reference to FIG. 2 in more detail.

For a more detailed description related thereto, it will be described with reference to FIG. 3. Referring to FIG. 3, in a step S110, the text may be classified into one of a plurality of predetermined quality categories. For example, the plurality of predetermined quality categories may include three categories. A first category may be a category in which texts with high quality are classified, a second category may be a category in which texts with intermediate quality are classified, and a third category may be a category in which texts with low quality are classified. For example, a system log recorded without user intervention may be classified into the first category having the texts with high quality. As another example, texts associated with counseling details through bulletin boards/mail may be classified into the second category having the texts with intermediate quality. As another example, texts associated with a telephone counseling history, which is made by speech to text (STT) conversion, may be classified into the third category with low quality. Although the present example describes quality categories in three categories, it should be noted that this is only an example, and any number of quality categories may be changed.

In some embodiments related to the step S110, the text may be corrected to correspond to the classified quality category. For example, the text classified into the first category having the texts with high quality may not be corrected, the text classified into the second category having the texts with intermediate quality may be subject to low-level corrections (e.g., correction by word included in the text), and the text classified in the third category having the texts with low quality may be subject to high-level corrections (e.g., both correction by word included in the text and correction by sentence included therein). According to the present embodiment, the correction corresponding to the quality of the original text may be performed to prevent computing resources from being unnecessarily wasted.

In some embodiments related to the step S110 for classifying the text into a plurality of quality categories, the text may be classified into one of a plurality of quality categories based on metadata of the text. Herein, the metadata of the text may include data on a file name, a file extension, and a file writer. For a more detailed example, a feature that may be included in the metadata may include features associated with Apache and Java in the file name, features associated with log and error in the file extension, or a system, feature associated with Linux, and Unix in the file writer. However, it should be noted that the scope of the present disclosure is not limited to the aforementioned examples, and all features that can be included in the metadata may be applied to the present disclosure.

In some embodiments related to text classification using the metadata, the features that may be included in the metadata are managed by a table, and when the features are detected in the metadata embedded in the text, scoring is performed, thereby classifying the text into one of the plurality of quality categories. In addition, in some cases, weights may be applied according to the features detected at the time of performing the scoring.

In some other embodiments related to the step S110 of classifying the text into the plurality of quality categories, the text may be classified into one of the plurality of quality categories, based on the degree of damage of the text. In this case, the degree of damage may be determined based on at least one frequency of word-spacing errors, typing errors, abbreviations and unknown words of the text included in the text. All known detection models for detecting the aforementioned spacing word-spacing errors, typing errors, abbreviations and unknown words may be applied to the present disclosure. For example, models such as a character error rate (CER) and a word error rate (WER) may be applied thereto.

In some embodiments related to the text classification using the degree of damage, the range of the degree of damage corresponding to each of the plurality of quality categories may be determined in advance, and the text may be classified into the quality category that corresponds to the degree of damage determined based on the at least one frequency of spacing word-spacing errors, typing errors, abbreviations and unknown words included in the text.

It will be described again with reference to FIG. 2.

Referring to FIG. 2, in a step S200, the text may be corrected based on the results of the test. For a more detailed description related thereto, it will be described with reference to FIG. 4.

Figure 4:
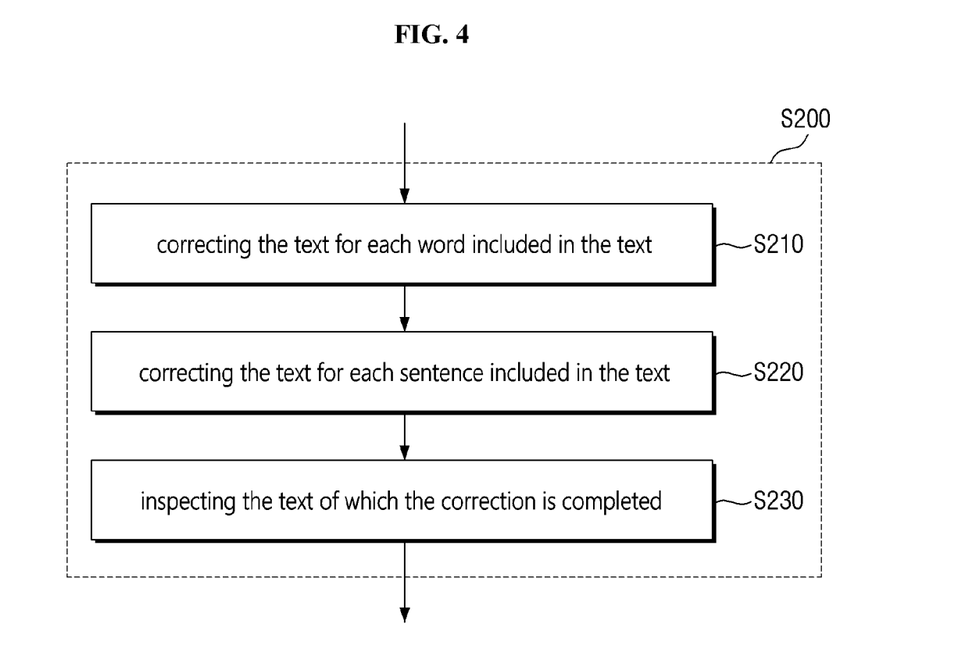
FIG. 4 is an exemplary flowchart illustrating an operation of correcting the text described with reference to FIG. 2 in more detail.

Referring to FIG. 4, in a step S210, the text may be corrected for each word included in the text. Herein, in order to correct the text for each word, at least one of typing errors, abbreviations and unknown words included in the text may be corrected. All known techniques for typing errors, abbreviations and unknown words included in the text may be applied to the present disclosure.

Next, in a step S220, the text may be corrected for each sentence included in the text. According to the present embodiment, an operation of correcting the text for each sentence is performed together with an operation of correcting the text for each word, and accordingly, the original text may be corrected later to a text in a form of facilitating the text analysis.

In some cases, the step S220 of correcting the text for each sentence may be omitted. According to the present embodiment, based on the results of the quality test of the text, only the correction for each word may be performed and the correction for each sentence may be omitted, thereby reducing the consumption of computing resources due to unnecessary correction.

A more detailed description related to the step S220 will be described with reference to FIG. 5.

Figure 5:
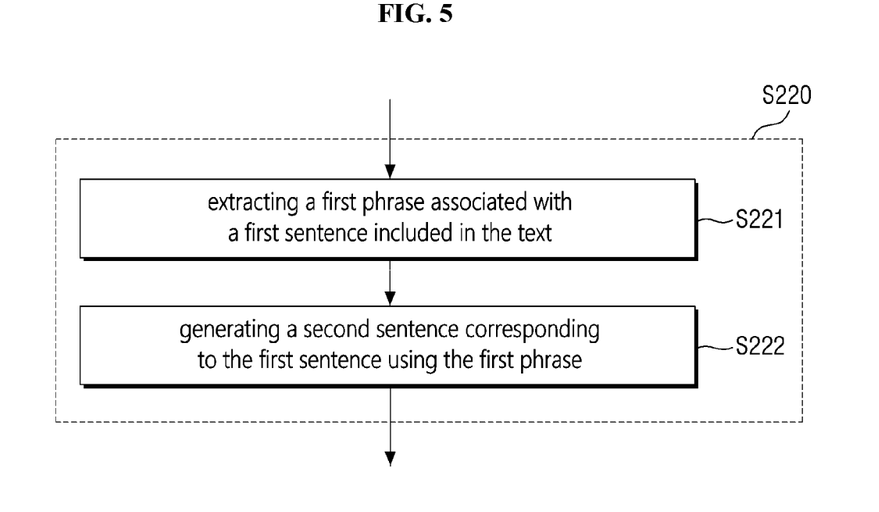
FIG. 5 is an exemplary flowchart illustrating in more detail an operation of correcting the text for each sentence described with reference to FIG. 4.

Referring to FIG. 5, in a step S221, a first phrase associated with a first sentence included in the text may be extracted. Herein, as a result of inputting the first sentence into a pre-learned language model, the first phrase having a maximum length may be extracted from a plurality of phrases output in association with the first sentence. In this case, the language model may include a GPT3 model, or may be a separate model learned for each domain.

In some embodiments related to the step S221, as a result of inputting the first sentence into the pre-trained language model, the first phrase with the highest degree of association with the first sentence may be extracted. In some cases, it should be noted that the length of the first phrase and the association between the first phrase and the first sentence may be considered together.

Next, in a step S222, a second sentence corresponding to the first sentence may be generated using the first phrase. Herein, as the second sentence is a sentence generated in association with the first phrase, it may be a sentence obtained by correcting the first sentence. In this case, all known techniques for generating the second sentence may be applied, and for example, an autoregressive language model for generating the text may be used.

According to the operations of the steps S221 to S222 described with reference to FIG. 5, each of the sentences included in the text is input into the pre-learned language model, the phrase associated with the sentence is extracted, and the sentence is generated based on the phrase, and accordingly, the original text may be corrected later to a text in a form of facilitating the text analysis.

It will be described again with reference to FIG. 4.

Referring to FIG. 4, in a step S230, the text of which the correction is completed may be inspected. For example, a connection inspection between the sentences included in the text may be performed, and as another example, a pre-inspection of a domain may be performed. According to the operations described with reference to FIG. 4, the correction of the original text based on the quality inspection of the text may be performed. Since the text is corrected for each word and for each sentence, the original text may be corrected later to a text in a form of facilitating the text analysis.

It will be described again with reference to FIG. 2.

Referring to FIG. 2, in a step S300, a noise candidate may be selected for each sentence based on the type of sentences included in the text. According to the present embodiment, since the noise candidates are selected for each sentence included in the text, a sentence that lowers the accuracy of the text analysis or a sentence that does not require analysis due to formal repetition may be selected as the noise candidate.

A more detailed description related thereto will be described with reference to FIGS. 6 and 7.

In some embodiments of the present disclosure, the text may be a text in which a conversation between a plurality of speakers is recorded. For example, a text with a conversation between a questioner and an answerer recorded therein, such as a text in which counseling details of a customer center, are recorded may be a text in which the content of a conversation between the plurality of speakers according to the present embodiment is recorded.

In some embodiments, when the text is a text in which the conversation between the plurality of speakers is recorded, an operation of identifying the speakers corresponding to the sentence included in the text may be preceded to select the noise candidate. According to the present embodiment, the patterns of sentences repeatedly recorded in the text may be different from each other for each speaker, thus making it easier to select the noise candidate. For example, in the text in which the counseling details of the customer center are recorded, a sentence corresponding to the respondent is very likely to be a static type sentence to be described later with reference to FIG. 7, and thus, the noise candidate may be elaborately selected for each sentence. A sentence corresponding to the questioner is highly likely to be a dynamic type sentence to be described later with reference to FIG. 7, and thus, the noise candidate may be schematically selected for each sentence. For another example, in the text in which the counseling details of the customer center are recorded, a sentence corresponding to a respondent A may be compared to a sentence included in the noise candidate for a predetermined respondent A, and a sentence corresponding to a respondent B may be compared to a sentence included in the noise candidate for a predetermined respondent B, thus selecting the noise candidate for each speaker.

Hereinafter, an operation of identifying the speaker and selecting the noise candidate will be described in more detail with reference to FIG. 6.

Figure 6:
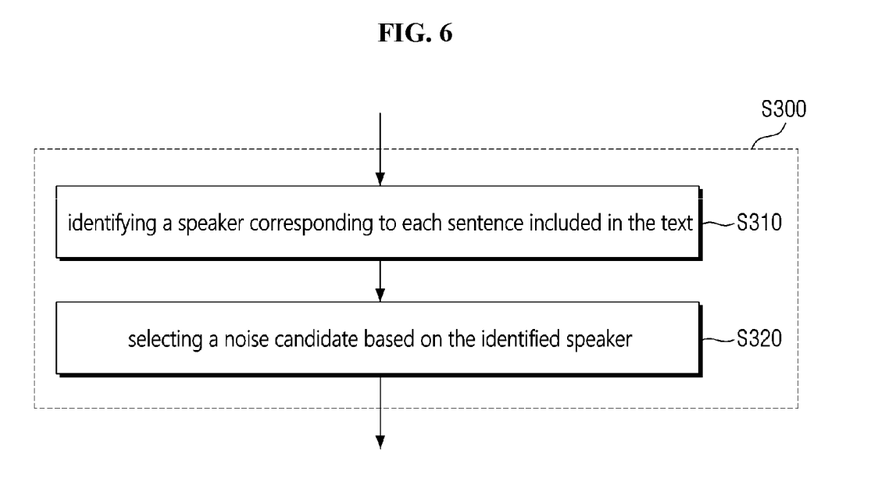
FIG. 6 is an exemplary flowchart illustrating an operation of selecting a noise candidate described with reference to FIG. 2 in more detail.

Referring to FIG. 6, in a step S310, a speaker that corresponds to each sentence included in the text may be identified. According to the present embodiment, since the speaker is identified for each sentence, the noise candidate may be selected later based on the identified speaker.

In some embodiments related to step S310, when the metadata is embedded in the original text, the speaker may be identified with reference to the metadata.

In some other embodiments related to the step S310, a pre-learned speaker identification model may be used. For example, in the case of the question/answer type text, a question/answer determination model may be used, and the question/answer determination model may be a model that determines whether an input sentence belongs to either a question sentence or an answer sentence. As another example, a text classification model may be used, and the text classification model may be a model that classifies an input sentence into a sentence of a certain member in a group. In addition, it may be understood that various speaker identification models for identifying the speaker may be used.

In some other embodiments related to the step S310, when a speaker corresponding to each of a plurality of sentences included in the paragraph of the text is determined as a first speaker that is equal to or greater than a reference ratio, the speaker corresponding to the paragraph may be identified as a first speaker. Specifically, each of the plurality of sentences included in the paragraph may be labeled to correspond to the identified speaker, and when a label included in the paragraph is determined as a label corresponding to the first speaker that is equal to or greater than the reference ratio, the speaker corresponding to the paragraph may be identified as the first speaker. According to the present embodiment, since the speaker corresponding to one paragraph is very likely to be one speaker, even when there are a plurality of speakers corresponding to the paragraph at the time of identifying the speaker for each sentence, the speakers that correspond to each of the plurality of sentences included in the paragraph may be identified as one speaker.

Next, in a step S320, the noise candidate may be selected based on the identified speaker. According to the present embodiment, as described above, and the patterns of the sentences repeatedly recorded in the text may be different from each other for each speaker, thereby making it easier to select the noise candidate.

So far, the embodiment of selecting the noise candidate by identifying the speaker corresponding to the text has been described with reference to FIG. 6. Hereinafter, another embodiment of selecting the noise candidate will be described with reference to FIG. 7.

Figure 7:
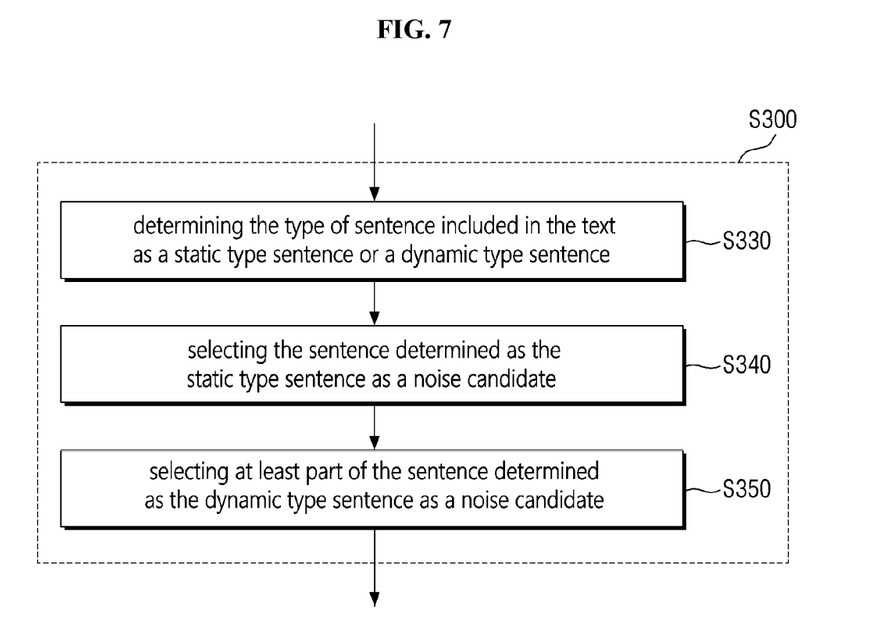
FIG. 7 is another exemplary flowchart illustrating an operation of selecting a noise candidate described with reference to FIG. 2 in more detail.

Referring to FIG. 7, in a step S330, the type of sentences included in the text may be determined as one of a static type sentence and a dynamic type sentence. Herein, the static type sentence may refer to a sentence repeatedly included for each text, and the dynamic type sentence may refer to a sentence except the static type sentence.

In some embodiments related to the step S330, the type of sentences may be determined based on a plurality of pre-stored texts. More specifically, the type of sentences may be determined based on the text stored in the database 200 illustrated in FIG. 1. More specifically, when a sentence A included in the text is included more than the reference ratio in a plurality of stored texts, the sentence A may be determined as the static type sentence, and when the sentence A is included therein less than the reference ratio, the sentence A may be determined as the dynamic type sentence.

In some other embodiments related to the step S330, the type of sentence may be determined based on a storage text of the same type of speaker among a plurality of pre-stored storage texts. More specifically, when a sentence B included in the text is identified as a sentence of the questioner, and the sentence B is included more than the reference ratio in the sentence corresponding to the questioner among the plurality of storage texts, the sentence B may be determined as the static type sentence, and when the sentence B is included therein less than the reference ratio, the sentence B may be determined as the dynamic type sentence.

In some other embodiments related to the step S330, the type of sentence may be determined based on the storage text of the same type of speaker among the plurality of pre-stored storage texts. More specifically, when a sentence C included in the text is identified as a sentence of an answerer C, and the sentence C is included more than a reference ratio in the sentence C corresponding to the answerer C among the plurality of storage texts, the sentence C may be determined as the static type sentence, and when the sentence C is included therein less than the reference ratio, the sentence C may be determined as the dynamic type sentence To perform the operations described in association with the step S330, an identity and similarity determination model of the sentence may be used, and all known techniques may be applied to the identity and similarity determination model of the sentence. In some cases, the sentence may be determined to be included in the stored text only when the sentence included in the text and the sentence included in the stored text are equal to each other, but the present disclosure is not limited thereto, and when the similarity is equal to or higher than a reference value, the sentence may be determined to be included in the stored text.

Figure 10:
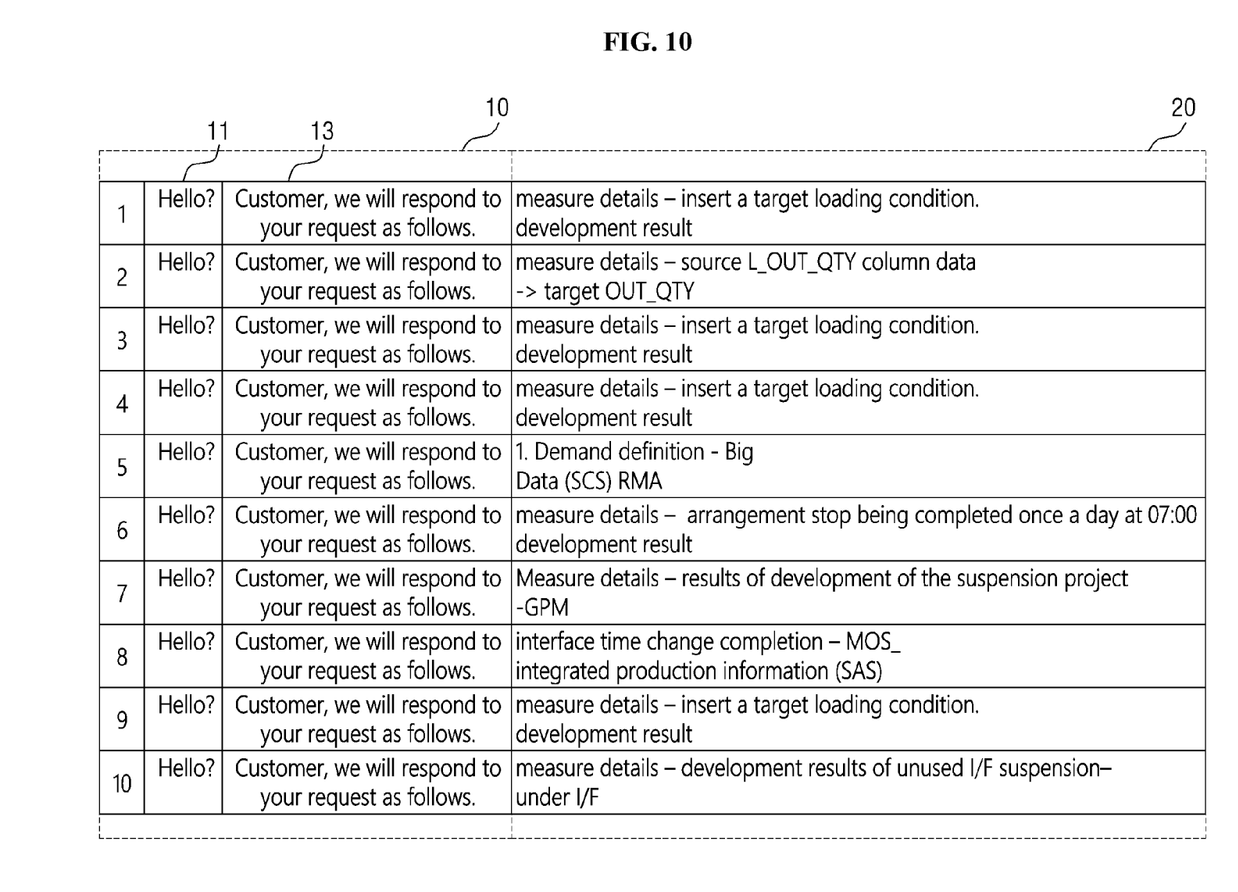
FIG. 10 is an example view illustrating a question/answer type text that may be referenced in some embodiments.

A detailed example of the static type sentence and the dynamic type sentence will be described with reference to FIG. 10. The plurality of sentences illustrated in FIG. 10 are one example of a question/answer type text. As illustrated in FIG. 10, the sentence of a static type 10 and the sentence of a dynamic type 20 may be included in the text. The sentence of the static type 10 may include a greeting 11 and a formally repeated manual guide 13, and the sentence of the type sentence 10 described above may be noise that reduces the performance of analysis at the time of analyzing some texts. Accordingly, according to some embodiments of the present disclosure to be embodied by the description later, the sentence of the type sentence 10 may be selected as the noise candidate, and at least some of the sentences included in the noise candidate may be removed depending on the purpose of the text. It will be described again with reference to FIG. 7.

Next, in a step S340, the sentence determined as the static type sentence may be selected as the noise candidate. Herein, the static type sentence may be noise that reduces performance of analysis at the time of analyzing some texts. Therefore, the static type sentence may be preferably selected as the noise candidate.

Next, in a step S350, at least some of the sentences determined as the dynamic type sentence may be selected as the noise candidate. In general, the dynamic type sentence may be a sentence that is subject to analysis at the time of analyzing the text, and thus the dynamic type sentence may not be preferably selected as the noise candidate. However, as in the present embodiment, even the dynamic type sentence may be selected as the noise candidate when it is not subject to analysis. For example, the sentence representing personal information may be selected as the noise candidate, and the sentence representing emotion may also be selected as the noise candidate. In addition, it may be understood that sentences that are not subject to analysis may be selected as the noise candidates.

It will be described again with reference to FIG. 2.

Referring to FIG. 2, in a step S400, at least some of the sentences included in the noise candidate may be removed from the text depending on the purpose of the text. According to the present embodiment, noise removal that is suitable for the purpose of the text may be performed. For example, for the search model, noise may not be removed, which can help to improve search performance, and accordingly, the sentences included in the noise candidates may not be removed from the text. For another example, for the classification model, only some of the sentences included in the noise candidate can be removed from the text to improve classification performance. For another example, for the topic extraction model, the clustering model, the event processing model, and the inference model, all sentences included in the noise candidate may be removed from the text to enhance their performance. For another example, for the emotion analysis model, only sentences representing emotions that may be selected as the noise candidate may be extracted from the text.

A more detailed description related to the step S400 will be described with reference to FIGS. 8 and 9.

Figure 8:
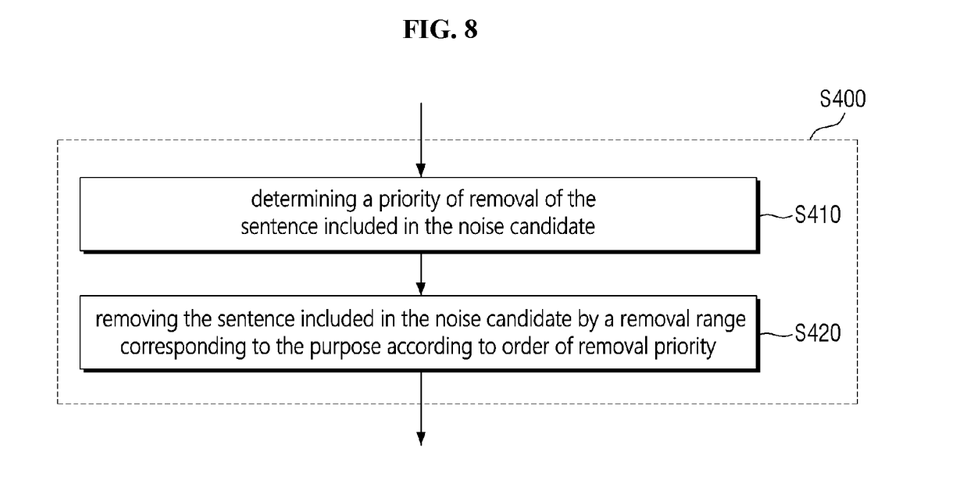
FIG. 8 is an exemplary flowchart illustrating an operation of removing text noise described with reference to FIG. 2 in more detail.

Referring to FIG. 8, in a step S410, a removal priority of the sentence included in the noise candidate may be determined, and in a step S420, the sentence included in the noise candidate may be removed from the text by a removal range corresponding to the purpose according to the removal priority. According to the embodiment described with reference to FIG. 8, the removal priority for each sentence included in the noise candidate may be determined and the sentence may be removed from the text by the removal range corresponding to the purpose according to the removal priority, thereby individually removing the sentence included in the noise candidate from the text depending on the purpose.

Figure 9:
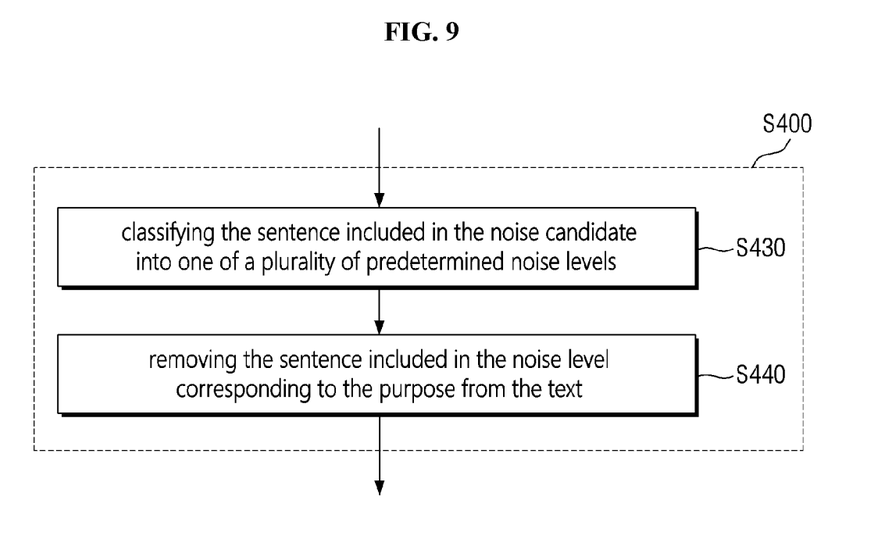
FIG. 9 is another exemplary flowchart illustrating an operation of removing text noise described with reference to FIG. 2 in more detail.

Referring to FIG. 9, in a step S430, the sentence included in the noise candidate may be classified into one of a plurality of predetermined noise levels, and in a step S440, the sentence included in the noise level corresponding to the purpose may be removed from the text. According to the embodiment described with reference to FIG. 9, the sentences included in the noise candidate may be classified according to the noise level and the sentence included in the noise level corresponding to the purpose may be removed from the text, thereby removing the sentence included in the noise level at once from the text depending on the purpose.

So far, the method for removing text noise according to some embodiments of the present disclosure described with reference to FIGS. 2 to 10 may remove noise in sentence units from the text. According to the present embodiment, the text analysis performance may be improved by removing the text noise in sentence units from the text. In addition, the text analysis performance may be further improved by adjusting the level of noise removal to correspond to the analysis purpose of the text.

Figure 11:
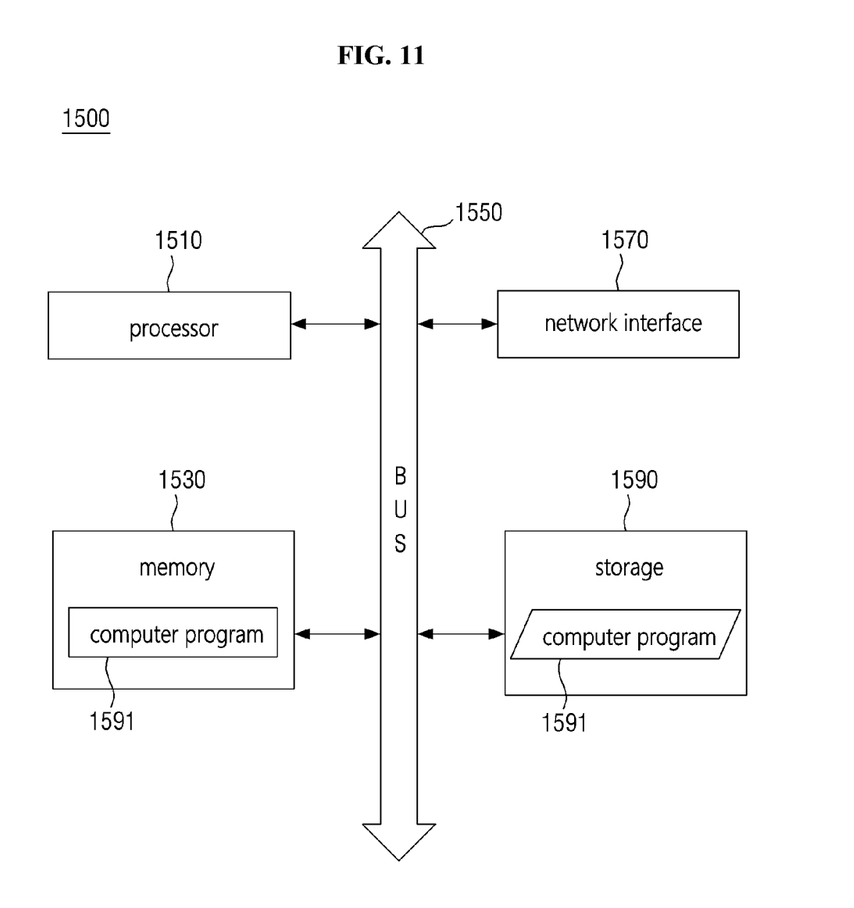
FIG. 11 illustrates an exemplary computing device capable of implementing an apparatus and/or a system according to various embodiments of the present disclosure.

Hereinafter, an exemplary computing device 1500 capable of implementing the noise removing apparatus according to some embodiments of the present disclosure will be described in more detail with reference to FIG. 11.

The computing device 1500 may include one or more processors 1510, a bus 1550, a communication interface 1570, a memory 1530 configured to load a computer program 1591 executed by the processor 1510, and a storage 1590 configured to store the computer program 1591. However, FIG. 11 illustrates only components related to an embodiment of the present disclosure. Therefore, it may be seen by those skilled in the art to which the present disclosure belongs that other universal components may be further included in addition to the components illustrated in FIG. 11.

The processor 1510 controls overall operations of each component of the computing device 1500. The processor 1510 may include a central processing unit (CPU), a microprocessor unit (MPU), a micro-controller unit (MCU), a graphical processing unit (GPU), or any type of processor known in the technical field of the present disclosure. In addition, the processor 1510 may perform arithmetic operations for at least one application or program for the purpose of executing the method according to embodiments of the present disclosure. The computing device 1500 may include one or more processors.

The memory 1530 stores different kinds of data, commands, and/or information. The memory 1530 may load one or more programs 1591 from the storage 1590 to execute the method according to the embodiments of the present disclosure. The memory 1530 may be implemented with a volatile memory such as RAM, but the technical scope of the present disclosure is not limited thereto.

The bus 1550 provides a communication function between the components of the computing device 1500. The bus 1550 may be implemented as various types of buses such as an address bus, a data bus, and a control bus.

The communication interface 1570 supports wired/wireless Internet communication of the computing device 1500. In addition, the communication interface 1570 may support a variety of communication methods other than Internet communication. To this end, the communication interface 1570 may include a communication module known in the art of the present disclosure.

According to some embodiments, the communication interface 1570 may be omitted.

The storage 1590 may non-temporarily store the one or more programs 1591 and different kinds of data.

The storage 1590 may include non-volatile memories such as a read only memory (ROM), erasable programmable ROM (EPROM), electrically erasable programmable ROM (EEPROM) and a flash memory, a hard disk, a removable disk, or any type of computer-readable recording medium known in the technical field to which the present disclosure belongs.

The computer program 1591 may include one or more instructions that cause the processor 1510 to execute the method/operation according to a variety of embodiments of the present disclosure when loaded into the memory 1530. That is, the processor 1510 may perform methods/operations according to a variety of embodiments of the present disclosure by executing the one or more instructions.

In this case, the noise removing apparatus according to some embodiments of the present disclosure may be implemented with the computing device.

So far, a variety of embodiments of the present disclosure and the effects according to embodiments thereof have been mentioned with reference to FIGS. 1 to 11. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for removing text noise performed by a computing device, the method comprising:
    inspecting quality of the text;
    correcting the text based on a result of inspection;
    selecting a noise candidate based on a type of sentences included in the corrected text, wherein the noise candidate is selected for each sentence included in the corrected text, and the type comprises a static type and a dynamic type;
    determining at least some of the sentences included in the noise candidate based on a purpose of a model to be trained using the text as a noise sentence; and
    removing the noise sentence from the corrected text,
    wherein the selecting of the noise candidate comprises:
    identifying a type of speaker corresponding to each sentence included in the corrected text;
    determining a type of a specific sentence included in the corrected text as the static type by comparing the specific sentence with pre-stored text corresponding to the identified type among a plurality of pre-stored texts; and
    determining the specific sentence determined as the static type as the noise candidate.

2. The method for removing text noise of claim 1, wherein the inspecting of quality of a text comprises:
    classifying the text into one of a plurality of predetermined quality categories.

3. The method for removing text noise of claim 2, wherein the classifying of the text comprises:
    classifying the text into one of the plurality of quality categories based on metadata of the text,
    wherein the metadata comprises a file name and a file extension.

4. The method for removing text noise of claim 2, wherein the classifying of the text comprises:
    classifying the text into one of the plurality of quality categories based on a degree of damage of the text.

5. The method for removing text noise of claim 4, wherein the degree of damage is determined based on at least one frequency of word-spacing errors, typing errors, abbreviations and unknown words of the text.

6. The method for removing text noise of claim 2, wherein the correcting of the text comprises:
    correcting the text according to a degree of correction corresponding to the classified quality category.

7. The method for removing text noise of claim 1, wherein the correcting of the text comprises:
    correcting the text for each word included in the text, wherein at least one of typing errors, abbreviations and unknown words included in the text is corrected.

8. The method for removing text noise of claim 7, wherein the correcting of the text comprises:
    correcting the text that has been corrected for each of the words, for each sentence included in the text.

9. The method for removing text noise of claim 8, wherein the correcting of the text for each sentence comprises:
    extracting a first phrase having a maximum length among a plurality of phrases output in association with a first sentence, as a result of inputting the first sentence included in the text corrected for each of the words into a pre-trained language model; and
    generating a corrected sentence corresponding to the first sentence using an autoregressive language model for generating text from the extracted first phrase.

10. The method for removing text noise of claim 1, wherein the selecting of a noise candidate further comprises:
    identifying a speaker corresponding to each sentence included in the corrected text.

11. The method for removing text noise of claim 10, wherein the identifying of a speaker corresponding to each sentence comprises:
    when the speaker corresponding to each of the plurality of sentences included in a paragraph of the corrected text is determined as a first speaker that is equal to or greater than a reference ratio, identifying the speaker corresponding to the paragraph as the first speaker.

12. The method for removing text noise of claim 10, wherein the selecting of a noise candidate further comprises:
    selecting an additional noise candidate based on the identified speaker.

13. The method for removing text noise of claim 1, wherein the determining of the type of the specific sentences comprises:
    when the specific sentence included in the corrected text is included more than the reference ratio in the pre-stored text, determining the specific sentence included in the corrected text as the static type, and when the specific sentence included in the corrected text is included therein less than the reference ratio, determining the specific sentence included in the corrected text as the dynamic type.

14. The method for removing text noise of claim 1, wherein the selecting of a noise candidate further comprises:
    when a sentence determined as the dynamic type is representing personal information, determining the sentence as the noise candidate.

15. The method for removing text noise of claim 1, wherein the selecting of a noise candidate further comprises:
    when a sentence determined as the dynamic type is representing emotion, determining the sentence as the noise candidate.

16. The method for removing text noise of claim 1, wherein the removing of the noise sentence comprises:
    determining a priority of removal of the noise sentence; and
    removing the noise sentence from the corrected text by a removal range corresponding to the purpose according to the priority of removal.

17. The method for removing text noise of claim 1, wherein the removing of the noise sentence comprises:
    classifying the noise sentence into one of a plurality of predetermined noise levels; and
    removing the noise sentence classified to the noise level corresponding to the purpose from the corrected text.

18. An apparatus for removing text noise, comprising:
    a processor;
    a network interface; and
    a computer program loaded into the memory and executed by the processor,
    wherein the computer program comprises instructions that cause the processor to perform operations comprising:
    inspecting quality of the text;

correcting the text based on a result of inspection;
selecting a noise candidate based a type of sentences included in the corrected text, wherein the noise candidate is selected for each sentence included in the corrected text, and the type comprises a static type and a dynamic type;
determining at least some of the sentences included in the noise candidate based on a purpose of a model to be trained using the text as a noise sentence; and
removing the noise sentence from the corrected text,
wherein the selecting of the noise candidate comprises:
identifying a type of speaker corresponding to each sentence included in the corrected text;
determining a type of a specific sentence included in the corrected text as the static type by comparing the specific sentence with pre-stored text corresponding to the identified type among a plurality of pre-stored texts; and
determining the specific sentence determined as the static type as the noise candidate.

* * * * *